United States Patent
Rud et al.

(10) Patent No.: US 8,449,181 B2
(45) Date of Patent: May 28, 2013

(54) PROCESS FLUID TEMPERATURE MEASUREMENT

(75) Inventors: Jason H. Rud, Mayer, MN (US); Loren M. Engelstad, Norwood, MN (US)

(73) Assignee: Rosemount Inc., Eden Prairie, MN (US)

( * ) Notice: Subject to any disclaimer, the term of this patent is extended or adjusted under 35 U.S.C. 154(b) by 364 days.

(21) Appl. No.: 12/869,084

(22) Filed: Aug. 26, 2010

(65) Prior Publication Data
US 2012/0051399 A1    Mar. 1, 2012

(51) Int. Cl.
G01K 7/20    (2006.01)
G01R 27/02    (2006.01)

(52) U.S. Cl.
USPC ............. 374/185; 374/172; 374/E7.018

(58) Field of Classification Search
USPC ............. 374/183, 185, 172, 173, E7.018, 374/E7.021, E7.022, E7.024, E7.027; 327/512; 702/130
See application file for complete search history.

(56) References Cited

U.S. PATENT DOCUMENTS

| | | | | |
|---|---|---|---|---|
| 5,317,520 A * | 5/1994 | Castle | ............... | 702/58 |
| 5,703,575 A | 12/1997 | Kirkpatrick | ............... | 340/870.17 |
| 6,356,191 B1 | 3/2002 | Kirkpatrick et al. | ............ | 340/501 |
| 6,434,504 B1 * | 8/2002 | Eryurek et al. | ............... | 702/130 |
| 6,556,145 B1 | 4/2003 | Kirkpatrick et al. | ..... | 340/870.17 |
| 6,594,603 B1 * | 7/2003 | Eryurek et al. | ............... | 702/104 |
| 6,970,003 B2 * | 11/2005 | Rome et al. | ............... | 324/718 |
| 7,367,712 B2 * | 5/2008 | Becker et al. | ............... | 374/185 |
| 7,630,861 B2 * | 12/2009 | Longsdorf et al. | ............ | 702/183 |
| 7,712,958 B2 | 5/2010 | Burmeister et al. | ............ | 374/183 |
| 2005/0011278 A1 * | 1/2005 | Brown et al. | ............... | 73/861.18 |
| 2008/0133170 A1 * | 6/2008 | Engelstad | ............... | 702/130 |
| 2008/0279255 A1 | 11/2008 | Burmeister et al. | ............ | 374/185 |

FOREIGN PATENT DOCUMENTS

| | | | |
|---|---|---|---|
| EP | 1431768 | | 11/2003 |
| JP | 2001208617 A | * | 8/2001 |
| JP | 2005-233737 | | 9/2005 |
| JP | 2012168106 A | * | 9/2012 |
| WO | WO2005/062012 | | 7/2005 |

OTHER PUBLICATIONS

Japanese Patent 2005233737 published Sep. 2, 2004; Abstract and Translation; date Aug. 20, 2008; 21 pages.
Notification of Transmittal, PCT International Search Report and Written Opinion for PCT Application No. PCT/US2011/047341, dated Nov. 14, 2011, 9 pgs.

* cited by examiner

*Primary Examiner* — R. A. Smith
(74) *Attorney, Agent, or Firm* — Westman, Champlin & Kelly, P.A.

(57) ABSTRACT

An apparatus for measuring a temperature of a process fluid includes a resistance based temperature sensor (RTD) sensor configured to thermally couple to the process fluid. First and second electrical connections are configured to apply a current through the RTD. Measurement circuitry is configured to measure a voltage across the RTD and identify a degraded connection to the RTD and responsively measure a temperature of the process fluid using the electrical connections.

21 Claims, 3 Drawing Sheets

PROCESS FLUID TEMPERATURE MEASUREMENT

BACKGROUND OF THE INVENTION

The present invention relates to industrial process control and monitoring systems. More specifically, the present invention relates to measurement of a temperature of a process fluid in such a system.

Industrial process control and monitoring systems are used to monitor and/or control industrial processes. For example, a process variable such as pressure, temperature, flow, etc. of a process fluid can be measured by a process variable transmitter. This information allows an operator to monitor operation of the process. Further, the measured process variable can be used as an input to a control algorithm and used to control operation of the process. In many instances, the process variable transmitter is located at a remote location and transmits information back to a central location over a process control loop. The process control loop can comprise a two wire process control loop in which the process variable is transmitted in an analog manner, for example, based upon a 4-20 mA current level flowing through the loop, or a digital manner to the central location. The same two wires can be used to provide power to the process variable transmitter. Another example process control loop is a wireless control loop in which data is transmitted wirelessly.

One type of process variable which is measured is temperature. Various types of temperature sensors are used to measure temperature. One type of temperature sensor is a resistance based temperature sensor known as an RTD. The resistance of the RTD varies as a function of temperature. Typically, the resistance is accurately measured using a Kelvin connection to the RTD in which a first pair of wires carry a current and a second pair of wires are used to measure a voltage drop across the RTD. If one of the connections degrades inaccurate temperature measurements may be obtained and maintenance must be performed.

SUMMARY OF THE INVENTION

An apparatus for measuring a temperature of a process fluid includes a resistance based temperature sensor (RTD) sensor configured to thermally couple to the process fluid. First and second electrical connections are configured to apply a current through the RTD. Third and fourth electrical connections are configured to measure a voltage across the RTD. Measurement circuitry is configured to identify a degraded connection to the RTD and responsively provided indication to the user and in extremely degraded conditions have the capability of measuring a temperature of the process fluid using less than all of the first, second, third and fourth electrical connections.

DETAILED DESCRIPTION OF ILLUSTRATIVE EMBODIMENTS

Figure 1:
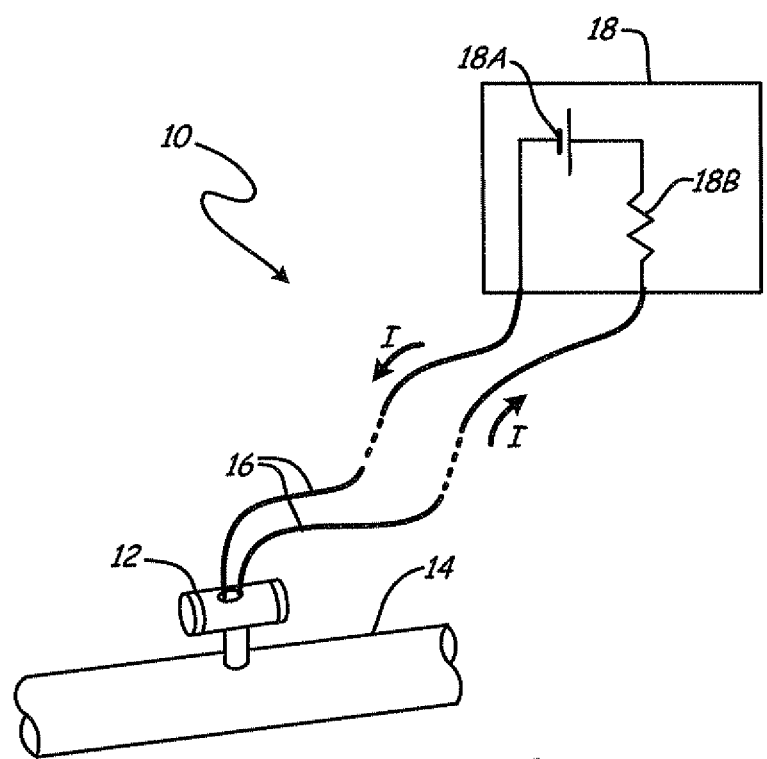
FIG. 1 is a simplified block diagram showing an industrial process control system including temperature transmitter.

The present invention provides a method and apparatus for sensing temperature of a process fluid using a resistance based temperature sensor (RTD) in a situation where a connection to the RTD has degraded or failed. RTD sensors are used to measure temperature of a process fluid. Such sensors, or the electrical connections to such a sensor, may periodically degrade or lose their integrity. In some instances, an operator may provide periodic scheduled maintenance to perform preventive maintenance prior to the ultimate failure of the sensor. In such a situation, unnecessary maintenance may be performed and functioning sensors and related wires may be unnecessarily discarded.

The failure of the RTD can arise from a number of different sources. The RTD itself may fail or a connection to the RTD may fail. For example, junctions (connections) to the RTD sensor may fail, fray or become loose or internal welds, within the sensor may degrade due to stress placed on the device due to temperature and vibration. Prior to failure, these issues can result in an increased line resistance and excessive voltage (residual EMF) (see for example, U.S. Pat. No. 6,356, 191 issued Mar. 12, 2002 entitled ERROR COMPENSATION FOR A PROCESS FLUID TEMPERATURE TRANSMITTER). The increased line resistance will decrease the signal to noise ratio and cause the measurement to be noisy. Further, increased line resistance can lead to inaccuracies in measurements due to a larger time constant inherent to the measurement circuitry. The larger the line resistance, the longer the time constant required to perform the measurement. Typically, the analog to digital converters used in process variable measurement systems have a programmable settling time that may not be adequate for the increased time constant due to increased line resistance. Increased EMF is a known problem with RTD sensor connections and can directly impact the ability of a process variable transmitter to perform accurate measurements. Process variables transmitters can be configured to correct for low levels of excessive EMF. Excessive voltages, however, may saturate the measurement circuitry.

The above described conditions can be used to detect impending sensor failures or connection integrity issues. When a temperature sensor fails, the process variable transmitter will need to be taken offline until the sensor has been replaced or the connection repaired. It would be desirable to provide information in advance that conditions exist that relate to a failing sensor and allow the maintenance to be scheduled while the sensor is still producing useful measurements.

In one aspect, the present invention provides a method and apparatus to track and compare RTD sensor measurement line characteristics over a period of time. An indication of abnormal conditions can be provided and, if desired, automatic correction may be used by the transmitter to correct for increased line resistance and excessive residual EMF. As discussed above, both increased line resistance and excessive residual EMF affect accuracy of sensor measurements and are impacted by degrading sensor elements in poor conditions that may be caused by loose wiring, vibrations, or corrosion.

Line resistance can be measured for each sensor wire of a 4-wire RTD sensor and two of the wires of a 3-wire RTD sensor. Further, the residual EMF can be measured for each of the lines. Residual EMF can be measured by turning off the current that is used to excite the RTD for normal RTD measurements. Once the current is turned off, the residual voltage can be measured as if it is a voltage sensor and used in a trend or subtracted from the measurement. The process variable transmitter can monitor the characteristic change during normal operation of the sensor and identify when one of the wires has an increased resistance or EMF in relation to the other wires.

FIG. 1 is a simplified diagram showing an industrial process control or monitoring system 10 in which a process variable transmitter 12 couples to an industrial process illustrated as process piping 14. Process variable transmitter 12 can comprise a process temperature transmitter in accordance with the present invention. Transmitter 12 is shown coupled to a two wire process control loop 16 as illustrated as coupled to a local control room 18 through a two wire process control loop 16. Control room 18 is illustrated as a power source 18A and a sense resistance 18B. The process control loop 16 can be in accordance with any process control loop or wireless connection to a host system. Loop 16 is illustrated as carrying a current. In one configuration, a two wire loop is provided in which the same two wires are used to provide power to transmitter 12 as well as provide communications with transmitter 12. For example, loop 16 can comprise a 4-20 mA current loop in which a current level is controlled by transmitter 12 to represent a process variable. In another example configuration, a digital signal is modulated onto loop 16 to carry the process information. Temperature transmitter 12 couples to process fluid carried in piping 16 and is configured to sense the temperature of the process fluid. In yet another example, wireless communication replaces wired communication.

Figure 2:
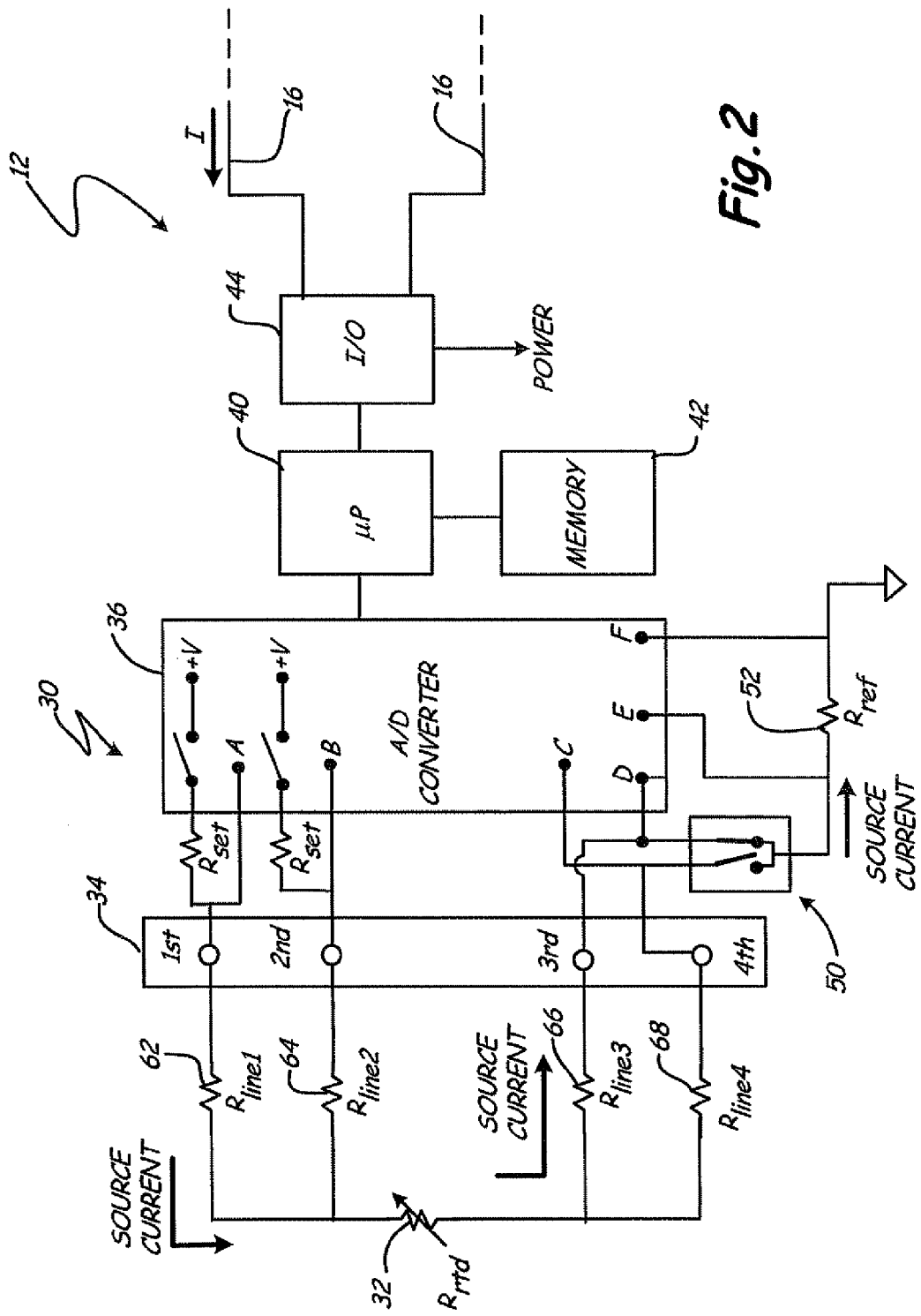
FIG. 2 is a simplified block diagram of the temperature transmitter of FIG. 1.

FIG. 2 is a simplified block diagram of temperature transmitter 12 coupled to process control loop 16. Transmitter 12 includes measurement circuitry 30 having a resistance based temperature sensor (RTD) 32 coupled to a terminal block 34 having first, second, third and fourth terminal connections. An analog to digital converter 36 couples to the terminal of terminal block 34 and includes connections A, B, C, D and E. Analog to digital converter 36 is configured to convert an analog signal into a digital value which is then provided to a microprocessor 40. Microprocessor 40 is also configured to control operation of the analog to digital converter and operates in accordance with instructions stored in a memory 42. Input/output circuitry 44 couples to the process control loop 16 and is configured to transmit information provided by microprocessor 40 over loop 16, or provide information received from loop 16 to microprocessor 40. In the configuration shown in FIG. 2, input/output circuitry 44 is also configured to provide power to the circuitry of the transmitter 12.

The temperature sensor 32 is coupled to terminal block 34 through a four wire "Kelvin" connection. In the configuration shown in FIG. 2, a source current is passed through the first terminal of terminal block 34 flows through the temperature sensor 32, and is received by the third terminal of terminal block 34. A reference select switch 50 is used as a redundant path to ground that is used to measure line resistance of both wires connected to terminals 3 and 4. It is also used as a method to provide a secondary ground path if it is necessary to switch out line 66 due to a degraded condition.

The electrical connections between sensor 32 and terminal block 34 include parasitic resistances illustrated as line resistors 62, 64, 66 and 68.

During operation, microprocessor 40 is configured to measure the resistance of temperature sensor 32. In some configurations, the microprocessor 40 can be configured to convert to the measured resistance into a temperature. Using the configuration shown in FIG. 2, the voltage across the temperature sensor 32 can be measured as follows:

$$V_{Rrtd}=V_{(B-C)} \quad \text{Eq. (1)}$$

The voltage across the reference resistance 52 is:

$$V_{Rref}=V_{(E-F)} \quad \text{Eq. (2)}$$

Then, the resistance of the sensor 32 is:

$$R_{rtd}=R_{Ref}*(R_{rtd}/V_{Rref}) \quad \text{Eq. (3)}$$

During normal operation, the transmitter can be configured to sense temperature using Equation 3 set forth above. If the transmitter detects an abnormal condition, for example, EMF or line resistance changes in relation to the other wires, a warning can be provided to an operator, for example over the process control loop 16. This type of a diagnostic warning can be provided if the detected error does not impact sensor measurement. The information provided to an operator can include, for example, the particular event detected, as well as which of the connection lines to the sensors 32 caused the abnormal condition.

However, if an abnormal condition exceeds a threshold, for example a threshold level stored in memory 42, the transmitter 12 can provide an output indicating a severe abnormal condition has occurred of the type which would affect temperature measurement. The microprocessor 40 can be configured to change the measurement path to bypass the connection causing the abnormal condition and operate as a three wire sensor.

Figure 3:
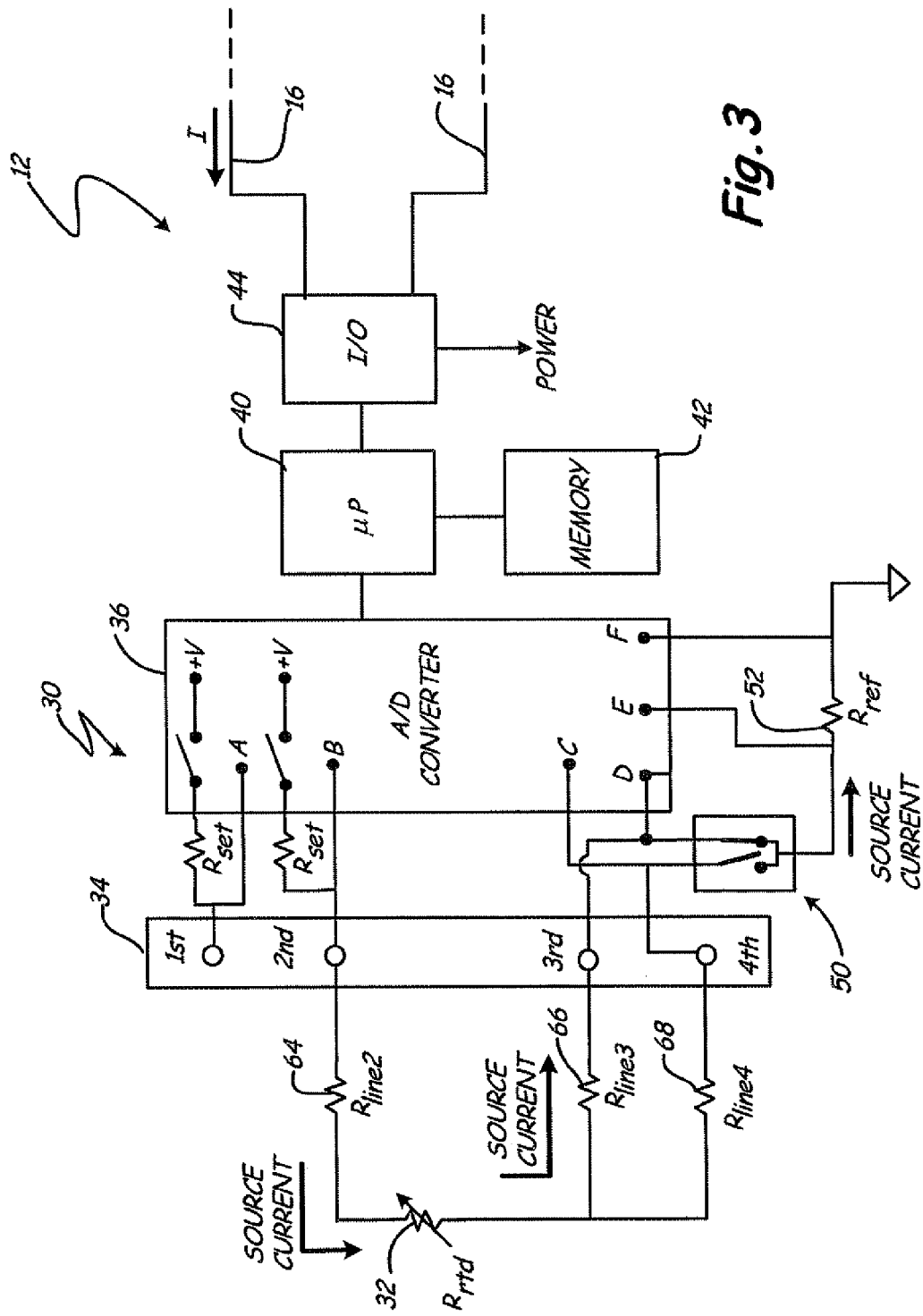
FIG. 3 is another simplified block diagram of the temperature transmitter of FIG. 1 shown in another mode of operation.

FIG. 3 illustrates transmitter 12 configured to measure the resistance of temperature sensor 32 using a three wire connection. This is an example of line 1 has degraded to the point where it would be best to not include it in the 4-wire measurement. The transmitter has removed line 1 from the measurement automatically and is using lines 2, 3, and 4 in a 3-wire configuration. There are a number of other ways that the transmitter can operate in 3-wire mode. If any one line fails, the transmitter can use the remaining for 3-wire mode. In FIG. 3, the resistance $R_{RTD}$ of the temperature sensor. 32 can be measured using the following equations:

$$V_{(B-D)}=V_{rtd}+V_{line}+V_{line} \quad \text{Eq. (4)}$$

$$V_{(C-D)}=V_{line} \quad \text{Eq. (5)}$$

$$V_{rtd}=V_{(B-D)}-2*V_{(C-D)} \quad \text{Eq. (6)}$$

$$V_{Rref}=V_{(E-F)} \quad \text{Eq. (7)}$$

$$R_{rtd}=R_{Ref}*(V_{rtd}/V_{ref}) \quad \text{Eq. (8)}$$

This configuration will provide a highly accurate measurement until the operator is able to resolve the abnormal condition. In FIG. 3, the microprocessor 40 can control operation of the analog to digital converter 36 to provide a selectable excitation current path to thereby eliminate any one wire and continue operation of the temperature sensor 32 in a three-wire mode. As mentioned above, microprocessor 40 can also provide a warning output to an operator that it is operating in a three wire mode.

The detection of the abnormal event can be based upon any appropriate diagnostic technique including monitoring of statistics such as standard deviation, minimum and maximum levels, and others. In addition to switching to a three wire configuration, the sensor 32 can be operated in a two wire mode if two of the four wires fail. In such a configuration, accuracy will be lost and errors introduced. The resistance of the connection leads must be compensated to increase the accuracy of measurements. However, this will allow the transmitter 12 to provide some measurement, even though they are inaccurate, until the failure can be corrected.

Although the present invention has been described with reference to preferred embodiments, workers skilled in the art will recognize that changes may be made in form and detail without departing from the spirit and scope of the invention.

What is claimed is:

1. An apparatus for measuring a temperature of a process fluid comprising:

a resistance based temperature (RTD) sensor configuration to thermally couple to the process fluid;

first and third electrical connections configured to apply a current through an RTD;

second and fourth electrical connections configured to measure a voltage across the RTD; and measurement circuitry configured to identify a degraded connection if at least one of the connections to the RTD becomes degraded and responsively measure a temperature of the process fluid using less than all of the first, second, third and fourth electrical connections, wherein the degraded connection is detected based upon comparing monitored resistance or residual EMF for each of the first, second, third and fourth connections with resistance or residual EMF of the other of the first, second, third and fourth connections.

2. The apparatus of claim 1 wherein the degraded connection is detected based upon a change in EMF or resistance of a connection to the RTD.

3. The apparatus of claim 1 wherein the measurement circuitry is configured to measure the temperature of the process fluid using three connections to the RTD.

4. The apparatus of claim 1 wherein the measurement circuitry is configured to measure the temperature of the process fluid using two connections to the RTD.

5. The apparatus of claim 1 wherein the first and second connections to the RTD couple to a first side of the RTD and wherein either of the first and second connections can be configured to selectively provide the current through the RTD.

6. The apparatus of claim 1 including a reference resistor and wherein the temperature measurement is related to a comparison of a resistance of the RTD to the resistance of the reference resistor.

7. The apparatus of claim 1 including circuitry configured to provide an output on a process control loop.

8. The apparatus of claim 7 wherein the process control loop comprises a two wire process control loop which is further configured to power circuitry of the apparatus.

9. The apparatus of claim 7 wherein the process control loop comprises a wireless process control loop.

10. The apparatus of claim 1 including an I/O circuitry configured to provide an output indicating a degraded connection to the RTD has been detected.

11. The apparatus of claim 10 wherein the output is provided on a process control loop.

12. A method of sensing temperature of a process fluid, comprising:

thermally coupling a resistance based temperature sensor (RTD) to the process fluid;

causing a current to flow through the RTD using a first and third connection to the RTD;

measuring a voltage across the RTD using a second and a fourth connection to the RTD;

identifying a degraded connection to the RTD based upon a change in EMF or line resistance; and responsively measuring a temperature of the process fluid using less than all of the first, second, third and fourth connections to the RTD when a degraded connection is detected, wherein the RTD degraded connection is detected based upon comparing monitored resistance or residual EMF for each of the first, second, third and fourth connections with resistance or residual EMF of the other of the first, second, third and fourth connections.

13. The method of claim 12 wherein the resistance of the RTD is measured using three connections to the RTD.

14. The method of claim 12 wherein resistance of the RTD is measured using two connections to the RTD.

15. The method of claim 12 wherein the first and second connections to the RTD couple to a first side of the RTD and wherein either of the first and second connections can be configured to selectively provide the current through the RTD.

16. The method of claim 12 including providing a reference resistor and wherein the temperature measurement is related to a comparison of a resistance of the RTD to the resistance of the reference resistor.

17. The method of claim 12 including providing an output on a process control loop related to sensed temperature.

18. The method of claim 17 wherein the process control loop comprises a two wire process control loop.

19. The method of claim 17 wherein the process control loop comprises a wireless process control loop.

20. The method of claim 12 including providing an output indicating a degraded connection to the RTD has been detected.

21. The method of claim 20 wherein the output is provided on a process control loop.

* * * * *